United States Patent Office 3,505,368
Patented Apr. 7, 1970

---

3,505,368
FLUOROALKOXIDE DERIVATIVES OF HAFNIUM
James S. Skelcey, James E. Rumminger, and Kenneth O. Groves, Midland, Mich., assignors to The Dow Chemical Company, Midland, Mich., a corporation of Delaware
No Drawing. Filed Nov. 27, 1967, Ser. No. 685,963
Int. Cl. C07j 7/00
U.S. Cl. 260—429.3                    2 Claims

ABSTRACT OF THE DISCLOSURE

The invention is novel hafnium (IV) polyfluoroalkoxides and to a method for their preparation by reacting a hafnium (IV) halide with a polyfluoroalcohol. The compounds are high density fluids having utility as flotation liquids.

SUMMARY

The invention herein described was made in the course of or under a contract with the Department of the Air Force.

The present invention relates to fluorine containing metal alkoxides and more particularly is concerned with hafnium (IV) polyfluoroalkoxides and to a method of their preparation.

The novel compounds of the present invention correspond to the formula $$Hf(OR_f)_4$$

wherein $R_f$ is a polyfluorinated straight or branched chain aliphatic group having a total of from 5 to about 11 carbon atoms. The compounds are liquids having a relatively high density at room temperature.

These fluoroalkoxide derivatives are suitable for use as intermediates in the synthesis of other compounds in which a chloride ion is to be replaced by a fluoroalkoxy group. Further, these compounds, which are liquids at relatively low temperatures, because of their relatively high densities, can be used as flotation liquids, as for example in a gyroscope.

In general, the compounds are prepared by reacting in the presence of ammonia and in inert organic liquid solvent a hafnium (IV) halide, usually hafnium tetrachloride ($HfCl_4$), with a fluoroalcohol of formula $HOR_f$, where $R_f$ is the same as set forth hereinbefore. The corresponding hafnium (IV) fluoroalkoxide compound readily is separated and recovered from the reaction mass.

DESCRIPTION OF PREFERRED EMBODIMENTS

Preferred embodiments of the present invention comprise hafnium (IV) polyfluoroalkoxides of formula $$Hf(OR_f)_4$$

where $R_f$ is a highly fluorinated aliphatic radical containing from 7 to about 9 carbon atoms.

The compounds ordinarily are prepared by reacting with agitation a hafnium source material, e.g. hafnium chloride, with a fluoroalcohol ($HOR_f$) in an inert substantially anhydrous atmosphere. Usually, the fluoroalcohol is employed in about a stoichiometric amount, i.e. 4 moles per mole of hafnium tetrahalide, or in excess of that required for reaction with the hafnium tetrachloride. A liquid aliphatic or aromatic hydrocarbon or halogenated hydrocarbon, for example, benzene, hexane, carbon tetrachloride and the like is usually employed as a carrier or solvent. Additionally, ammonia is introduced into the reaction mass in a quantity at least sufficient to tie up and react with the halide moiety of the hafnium reactant.

Either of the reactants and ammonia can be used in excess of that required for reaction without any detrimental effects. The amount of inert diluent, i.e. carrier liquid to be used is not critical except that at a minimum the reaction mass must be sufficiently fluid to be readily agitated. The maximum amount of carrier ordinarily is selected so as to not require unduly large reactors and material handling equipment as well as to not provide an extremely dilute reaction mixture.

The reaction mixture is maintained at a temperature below the boiling point of the carrier liquid. Ordinarily the process is carried out at a temperature of from about room temperature up to abou 80° C. for a period of from about 1 to about 4 hours.

After the reaction period, insoluble reaction by-product, e.g. ammonium halide, is separated from the reaction mass as by filtration, and excess fluoroalcohol, if employed, as well as the solvent or carrier liquid are removed, as by low temperature evaporation. The so-separated hafnium polyfluoroalkoxide product usually is purified by distillation.

For optimum in product yield and purity, all procedural steps are carried out in a substantially anhydrous, inert atmosphere. Also, substantially anhydrous reactants usually are employed.

The following examples will serve to further illustrate the present invention but are not meant to limit it thereto.

Examples

*General preparation.*—A 250 milliliter round-bottom 3-neck flask equipped with a magnetic stirrer, reflux condenser, addition funnel and a gas dispersion tube was charged with a predetermined quantity of hafnium tetrachloride and 150 milliliters of benzene as carrier liquid. This operation was carried out in a dry box under a nitrogen atmosphere using substantially anhydrous materials. The flask was maintained under a nitrogen atmosphere and its contents stirred while a predetermined quantity of a polyfluoroalcohol was added dropwise thereto. After the alcohol addition was complete, ammonia gas, in a total quantity in excess of that required for reaction with the chloride from the hafnium reactant was passed through the reaction mixture for a three hour period. The resulting mass was filtered to remove solids therefrom and the benzene separated from the product by vacuum evaporation. The resulting hafnium polyfluoroalkoxide product was distilled under a low absolute pressure which at a maximum was about 0.005 millimeter mercury.

The so-purified product was analyzed and its structure proved by elemental chemical analysis and infrared spectroscopy. A number of the compound's identifying characteristics also were determined.

Table I summarizes the reactants and the concentrations used to prepare a number of hafnium (IV) polyfluoroalkoxide compounds following the procedure set forth directly hereinbefore.

Table II presents analytical data and property characteristics for these compounds.

In the two tables, corresponding example numbers refer to the same compound preparation.

TABLE I

| Run No. | HfCl₄ Grams | HfCl₄ Moles | Fluoroalcohol reactant Type | Grams | Moles | Product Name | Yield (g.) |
|---|---|---|---|---|---|---|---|
| 1 | 14.4 | 0.045 | Dodecafluoro-2-methyl-2-octanol | 69.0 | 0.192 | Hafnium dodecafluoro-2-methyl-2-octoxide. | 29.6 |
| 2 | 13.5 | 0.042 | Dodecafluoro-heptanol | 58.0 | 0.174 | Hafnium dodecafluoro-heptoxide | 10.0 |
| 3 | 20 | 0.062 | Hexadecafluoro-nonanol | 118 | 0.273 | Hafnium hexadecafluoro-nonoxide | 13.6 |

TABLE II

| Run No. | | | Analysis, Wt. percent | | | | | | Boiling point, °C./ mm. Hg | Density, g./cc. |
|---|---|---|---|---|---|---|---|---|---|---|
| | | | C Fd. | C Theo. | H Fd. | H Theo. | Hf Fd. | Hf Theo. | | |
| 1 | Hafnium dodecafluoro-2-methyl-2-octoxide. | $Hf[OC(CH_3)_2(CF_2)_5CF_2H]_4$ | 26.35 | 26.76 | 1.92 | 1.73 | 10.80 | 11.06 | 210/0.005 | 1.79 at 21° C. |
| 2 | Hafnium dodecafluoro-heptoxide. | $Hf[OCH_2(CF_2)_5CF_2H]_4$ | 21.85 | 22.38 | 1.11 | 0.80 | 11.90 | 11.88 | 245/0.003 | 2.00 at 25° C. |
| 3 | Hafnium hexadeca-fluorononoxide. | $Hf[OCH_2(CF_2)_7CF_2H]_4$ | 20.75 | 22.70 | 0.72 | 0.64 | 10.20 | 9.38 | 250/<0.001 | 2.05 at 23° C. |

The compounds were soluble in benzene, acetone and diethyl ether. They are sensitive to moisture especially when in solution.

Infrared analysis of the novel compounds gave spectra which were consistent with the assigned structure.

Because of their low melting points and relatively high densities these compounds have been shown to be suitable for use as stabilizing fluids for use in gyroscopes, for example.

In a manner similar to that described for the preceding examples, other liquid hafnium fluoroalkoxides can be prepared by reacting a hafnium tetrahalide such as for example, hafnium tetrachloride, hafnium tetrabromide or hafnium tetraiodide with a fluoroalcohol having at least 5 carbon atoms such as, for example, $HOC(CF_3)_2C_2F_5$, $HOC(CF_3)_2C(CF_3)_2OH$, $HOCH_2(CF_2)_xCF_3$ where $x$ is an integer from 3 up to 8 or more.

Various modifications can be made in the present invention without departing from the spirit or scope thereof for it is understood that we limit ourselves only as defined in the appended claims.

We claim:
1. Hafnium (IV) polyfluoroalkoxides corresponding to the formula $Hf(OR_f)_4$ where $R_f$ is a member selected from the group consisting of polyfluorinated straight or branched chain aliphatic groups having a total of from 5 to about 11 carbon atoms.

2. The hafnium polyfluoroalkoxides as defined in claim 1 wherein $R_f$ is a member selected from the group consisting of -dodecafluoro - 2 - methyl-2-octoxide, -dodecafluoroheptoxide or -hexadecafluorononoxide.

References Cited

UNITED STATES PATENTS 3,424,772  1/1969  Moshier _____ 260—429

OTHER REFERENCES

Bradley et al.: J. Chem. Soc., 1953, pp. 1634–6.

HELEN M. McCARTHY, Primary Examiner

A. P. DEMERS, Assistant Examiner